(12) United States Patent
Venkatappa et al.

(10) Patent No.: US 12,265,493 B2
(45) Date of Patent: Apr. 1, 2025

(54) DYNAMIC DMA BUFFER MANAGEMENT

(71) Applicant: ARRIS Enterprises LLC, Suwanee, GA (US)

(72) Inventors: Kumara Swamy Tadikavagilu Venkatappa, Bengaluru (IN); Vasudevan Jothilingham, Bengaluru (IN); Amit Kumar, Bengaluru (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 18/373,159

(22) Filed: Sep. 26, 2023

(65) Prior Publication Data

US 2024/0134809 A1    Apr. 25, 2024
US 2024/0232108 A9    Jul. 11, 2024

Related U.S. Application Data

(63) Continuation of application No. 17/547,077, filed on Dec. 9, 2021, now abandoned.

(60) Provisional application No. 63/123,310, filed on Dec. 9, 2020.

(51) Int. Cl.
*G06F 13/28* (2006.01)
*G06F 13/16* (2006.01)

(52) U.S. Cl.
CPC .......... *G06F 13/28* (2013.01); *G06F 13/1673* (2013.01)

(58) Field of Classification Search
None
See application file for complete search history.

(56) References Cited

U.S. PATENT DOCUMENTS

| | | | | |
|---|---|---|---|---|
| 5,956,346 A * | 9/1999 | Levan | ................ | H04L 12/2801 370/312 |
| 5,959,660 A * | 9/1999 | Levan | ................... | H04N 7/173 370/485 |
| 5,959,968 A | 9/1999 | Chin et al. | | |
| 5,963,557 A * | 10/1999 | Eng | ........................... | H04J 1/12 370/312 |
| 7,630,361 B2 * | 12/2009 | Chapman | ............ | H04L 12/2801 370/467 |
| 7,672,332 B1 * | 3/2010 | Chapman | ............ | H04L 12/2885 370/468 |
| 7,769,046 B1 * | 8/2010 | Crocker | .................. | H04L 45/28 370/469 |
| 7,860,084 B2 * | 12/2010 | Binder | ................... | H04N 7/108 370/352 |
| 8,707,370 B2 * | 4/2014 | Carter | .................... | H04H 20/08 725/39 |
| 8,848,725 B2 * | 9/2014 | Binder | ................ | H04L 12/2838 375/222 |
| 9,871,687 B2 * | 1/2018 | Abramson | ......... | H04N 21/4263 |
| 10,462,627 B2 * | 10/2019 | Raleigh | ................ | G06F 3/0482 |
| 10,892,827 B2 * | 1/2021 | Way | ................ | H04B 10/25073 |
| 11,290,903 B2 | 3/2022 | Khoshgard et al. | | |
| 2006/0159112 A1 * | 7/2006 | Sundaram | ............... | H04L 47/10 370/516 |
| 2008/0144621 A1 * | 6/2008 | Huang | ................ | H04L 67/1072 370/390 |

(Continued)

*Primary Examiner* — Henry Tsai
*Assistant Examiner* — Christopher A Bartels
(74) *Attorney, Agent, or Firm* — Chernoff, Vilhauer, McClung & Stenzel, LLP

(57) ABSTRACT

A system that includes dynamic DMA buffer management.

9 Claims, 4 Drawing Sheets

(56) References Cited

U.S. PATENT DOCUMENTS

| | | | | |
|---|---|---|---|---|
| 2011/0032428 | A1* | 2/2011 | Bing | H04N 21/8456 |
| | | | | 348/608 |
| 2013/0132854 | A1* | 5/2013 | Raleigh | G06F 3/0482 |
| | | | | 715/738 |
| 2015/0378737 | A1* | 12/2015 | Debbage | G06F 13/28 |
| | | | | 712/225 |
| 2017/0250754 | A1* | 8/2017 | Thompson | H04L 12/2838 |
| 2018/0113826 | A1* | 4/2018 | Li | G06F 13/24 |
| 2019/0199602 | A1* | 6/2019 | Zhang | G06F 8/31 |
| 2020/0045519 | A1* | 2/2020 | Raleigh | H04M 15/765 |
| 2021/0022027 | A1* | 1/2021 | Khoshgard | H04B 3/487 |
| 2022/0103892 | A1* | 3/2022 | Wheelock | H04N 21/222 |
| 2022/0179805 | A1* | 6/2022 | Hu | G06F 13/1673 |
| 2022/0312302 | A1* | 9/2022 | Feng | H04L 5/0007 |
| 2023/0396374 | A1* | 12/2023 | Chari | H04L 12/2801 |
| 2023/0396460 | A1* | 12/2023 | Chari | H04L 1/203 |
| 2024/0134809 | A1* | 4/2024 | Venkatappa | G06F 13/1673 |
| 2024/0232108 | A9* | 7/2024 | Venkatappa | G06F 13/1673 |

* cited by examiner

DYNAMIC DMA BUFFER MANAGEMENT

CROSS REFERENCE TO RELATED APPLICATIONS

This application is a continuation of U.S. patent application Ser. No. 17/547,077 filed Dec. 9, 2021, which claims the benefit of U.S. Provisional Application Ser. No. 63/123,310 filed Dec. 9, 2020.

BACKGROUND

The subject matter of this application relates to dynamic DMA buffer management.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
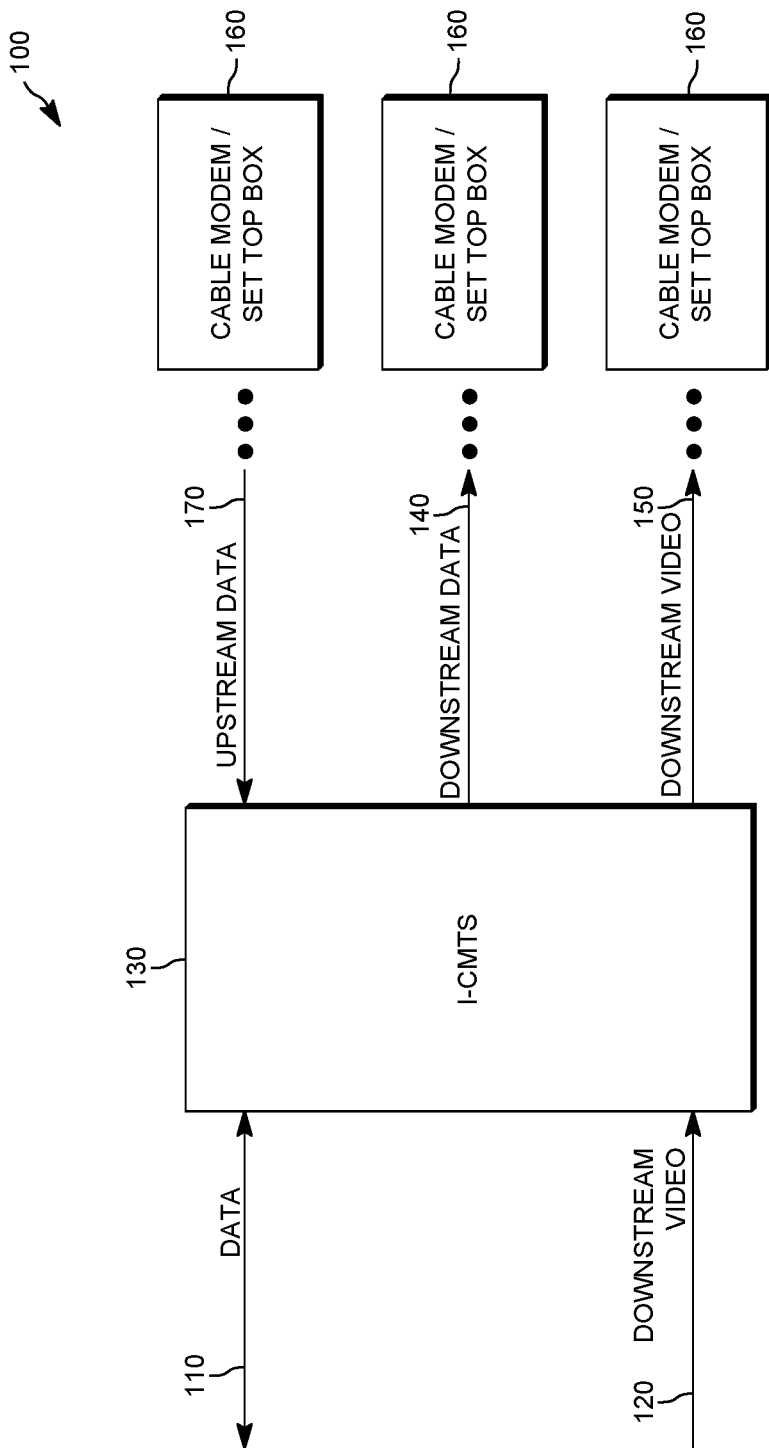
FIG. 1 illustrates an integrated Cable Modem Termination System a cable system.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
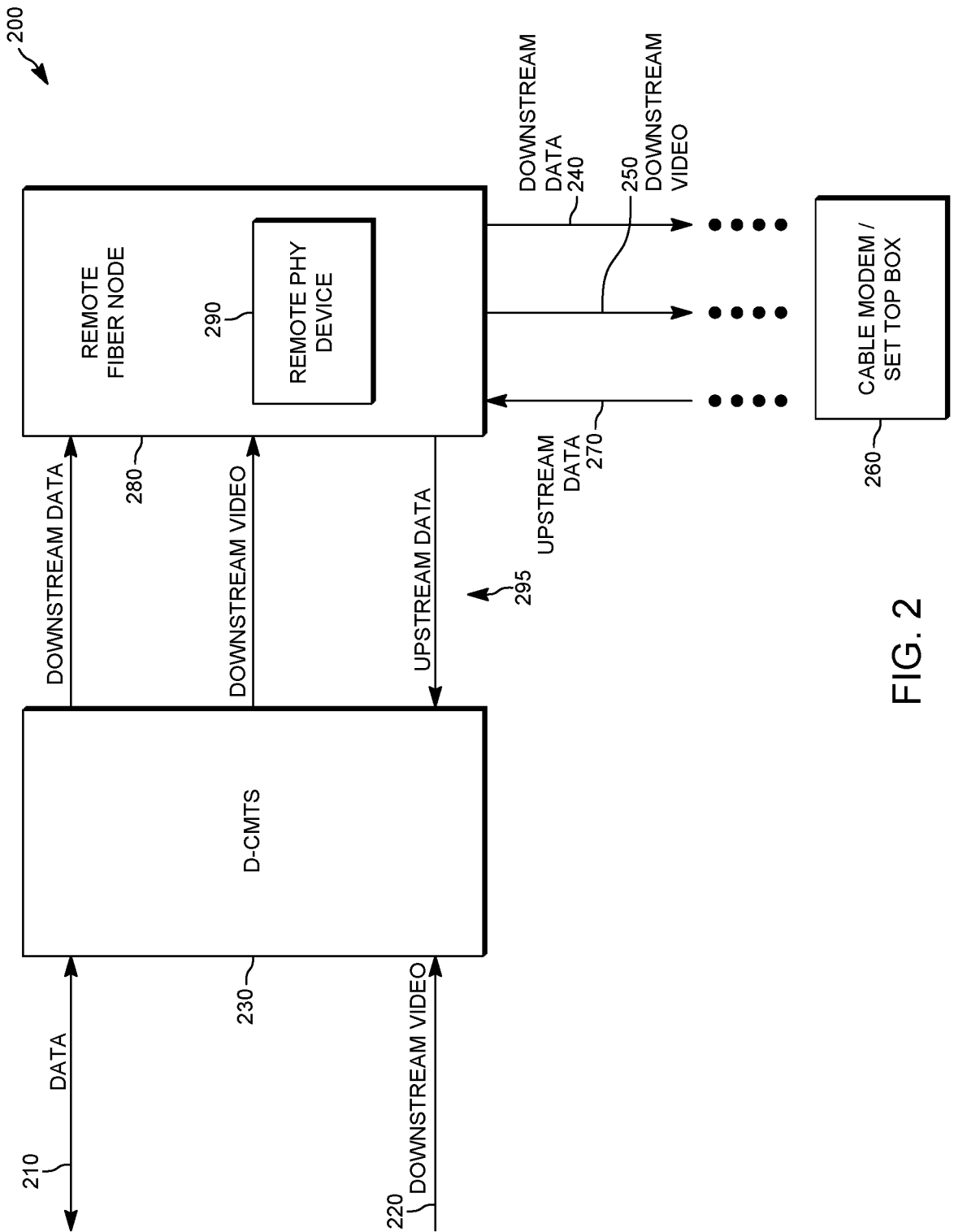
FIG. 2 illustrates a distributed Cable Modem Termination System a cable system.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote Fiber node 280 preferably include a remote PHY device 290.

The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with psuedowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230. In some cases, the remote PHY and/or remote MAC PHY functionality may be provided at the head end. In some cases, one or more of the devices may be virtualized on a common off the shelf server.

By way of example, the remote PHY (or MAC PHY) device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

Figure 3:
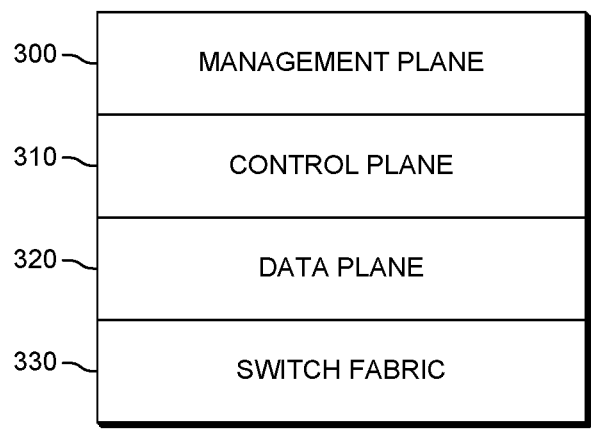
FIG. 3 illustrates a layered network processing stack.

Referring to FIG. 3, for data processing and for transferring data across a network, the architecture of the hardware and/or software may be configured in the form of a plurality of different planes, each of which performing a different set of functionality. In relevant part the layered architecture may include different planes such as a management plane 300, a control plane 310, a data plane 320, and switch fabric 330 to effectuate sending and receiving packets of data.

For example, the management plane 300 may be generally considered as the user interaction or otherwise the general software application being run. The management plane typically configures, monitors, and provides management and configuration served to all layers of the network stack and other portions of the system.

For example, the control plane 310 is a component to a switching function that often includes system configuration, management, and exchange of routing table information and forwarding information. Typically, the exchange of routing table information is performed relatively infrequently. A route controller of the control plane 310 exchanges topology information with other switches and constructs a routing table based upon a routing protocol. The control plane may also create a forwarding table for a forwarding engine. In general, the control plane may be thought of as the layer that makes decisions about where traffic is sent. Since the control functions are not performed on each arriving individual packet, they tend not to have a strict speed constraint.

For example, the data plane 320 parses packet headers for switching, manages quality of service, filtering, medium access control, encapsulations, and/or queuing. As a general matter, the data plane carriers the data traffic, which may be substantial in the case of cable distribution networks. In general, the data plane may be thought of as the layer that primarily forwards traffic to the next hop along the path to the selected destination according to the control plane logic through the switch fabric. The data plane tends to have strict speed constraints since it is performing functions on each arriving individual packet.

For example, the switch fabric 330 provides a network topology to interconnect network nodes via one or more network switches.

The networking between the different devices of the cable system is based, at least in part, upon the use of a maximum transmission unit (MTU) which is the size of the largest protocol data unit that can be communicated in a single network layer transaction. The MTU may be specified in terms of bytes. By way of example, with Ethernet, the maximum frame size is 1518 bytes, 18 bytes of which are overhead (header and frame check sequence), resulting in a MTU of 1500 bytes. A larger MTU brings a greater efficiency because each network packet carries more useful data with the protocol overheads remaining fixed. The greater efficiency results in an improvement in bulk protocol throughput. Accordingly, often in cable system device design, the MTU is set to a maximum value in order to support greater efficiency.

Each of the R-PHY (including R-MACPHY) devices of a cable network is typically configured with a fixed MTU size that is the maximum likely used within the cable system, such as either 2,000 bytes or 2,200 bytes. Each of the R-PHY devices when initialized on a cable system provides signalling of its configured MTU size to the CMTS, such as 2,000 bytes or 2,200 bytes. In response, the CMTS provides data transmissions to the respective R-PHY devices that do not exceed the MTU size for the particular R-PHY device. By way of example, a first R-PHY device may have a maximum MTU size of 2,200 bytes and the CMTS provides data within a MTU size that does not exceed 2,200 bytes. By way of example, a second R-PHY device may have a maximum MTU size of 2,000 bytes and the CMTS provides data within a MTU size that does not exceed 2,000 bytes. By way of example, a third R-PHY device may have a maximum MTU size of 1,500 bytes and the CMTS provides data within a MTU size that does not exceed the 1,500 bytes. In this manner, the CMTS selectively provides data with a MTU size for each of the R-PHY devices that are sized accordingly.

To accommodate the maximum MTU size that the R-PHY device is capable of handling, typically the data plane sets the size of direct memory access (DMA) buffers based upon the maximum allowed MTU size. Also, the R-PHY device is likewise capable of accommodating MTU size using the direct memory access (DMA) buffers for a smaller MTU size. For example, when setting the R-PHY device's MTU size for the buffer to 2,000 bytes, it is likewise capable of handing a MTU size of 1,500 bytes. Often, the CMTS is providing data to the same R-PHY device using different sized MTUs, depending on the type of content being provided. For example, data may be provided using a DOCSIS protocol having a MTU size of 2,000 bytes. For example, broadcast video may be provided using a MTU size of 1,500 bytes. Unfortunately, with the DMA buffers set to the maximum MTU size while receiving data having a smaller MTU size, the difference in the sizes of the MTU will result in unused cache in the hardware buffers. Accordingly, the processor will have wasted cache because the hardware will cache the entire buffer size for each MTU of data, even if a portion of the buffer for each MTU of data remains unused.

In other words, the hardware carries the cache buffer size in a manner independent of what is actually needed for a particular set of MTU data. Further, for a multi-core processor where multiple cores are forwarding the traffic for a shared Level 1 cache, if the DMA buffer size is set to the maximum MTU, the wasted empty cache results in poor data forwarding performance. Moreover, with wasted Level 1 cache, there is an increased likelihood that data will spill over into a Level 2 cache and/or a Level 3 cache, further exasperating the data forwarding performance.

In many cases, the MTU size provided by the CMTS may be dictated by the maximum MTU capabilities of other devices in the data path of the cable system, including layer 3 switches, routers, etc. For example, the R-PHY device may be capable of supporting a MTU size of 2,200 bytes, while another device in the data path may only be capable of supporting a MTU size of 1,500 bytes. In this case, the CMTS will provide MTU's sized to be no more than 1,500 bytes, leaving the R-PHY device with substantial "wasted cache". While signalling provides the CMTS with the configured size of the R-PHY device's MTU buffers, each of the R-PHY devices are unaware of the size of MTU buffers of other R-PHY devices in the cable system, nor the MTU size of other devices within the data path between a respective R-PHY device and the CMTS. Moreover, depending on the particular type of content, such as general data, DOCSIS compliant data, and broadcast video data, the MTU size provided by the CMTS may be different. As it may be observed, different portions of the cable system may support different maximum MTU sizes, all of which are unknown to a particular R-PHY device. It may be observed, that particular services, such as the DOCSIS service has a 1 to 1 relationship between the CMTS and the respective R-PHY device in that the data is transferred between the CMTS and the respective R-PHY device independent of other R-PHY devices. It may be observed, that particular services, such as broadcast video services has a 1 to many relationship between the CMTS and the respective R-PHY devices in that the data is transferred from the CMTS and the set of R-PHY devices independent of other R-PHY devices. As a general matter, the R-PHY device's broadcast their MTU size configuration, but the CMTS does not provide information of its MTU size being used to the R-PHY devices, since that is often further dependent upon the type of service and further dependent upon other devices within the cable system. Accordingly, while the R-PHY device may be configured for maximum performance based upon a large MTU size, it tends to often receive smaller MTU sized packets which tends to make the DMA buffer have wasted cache.

Figure 4:
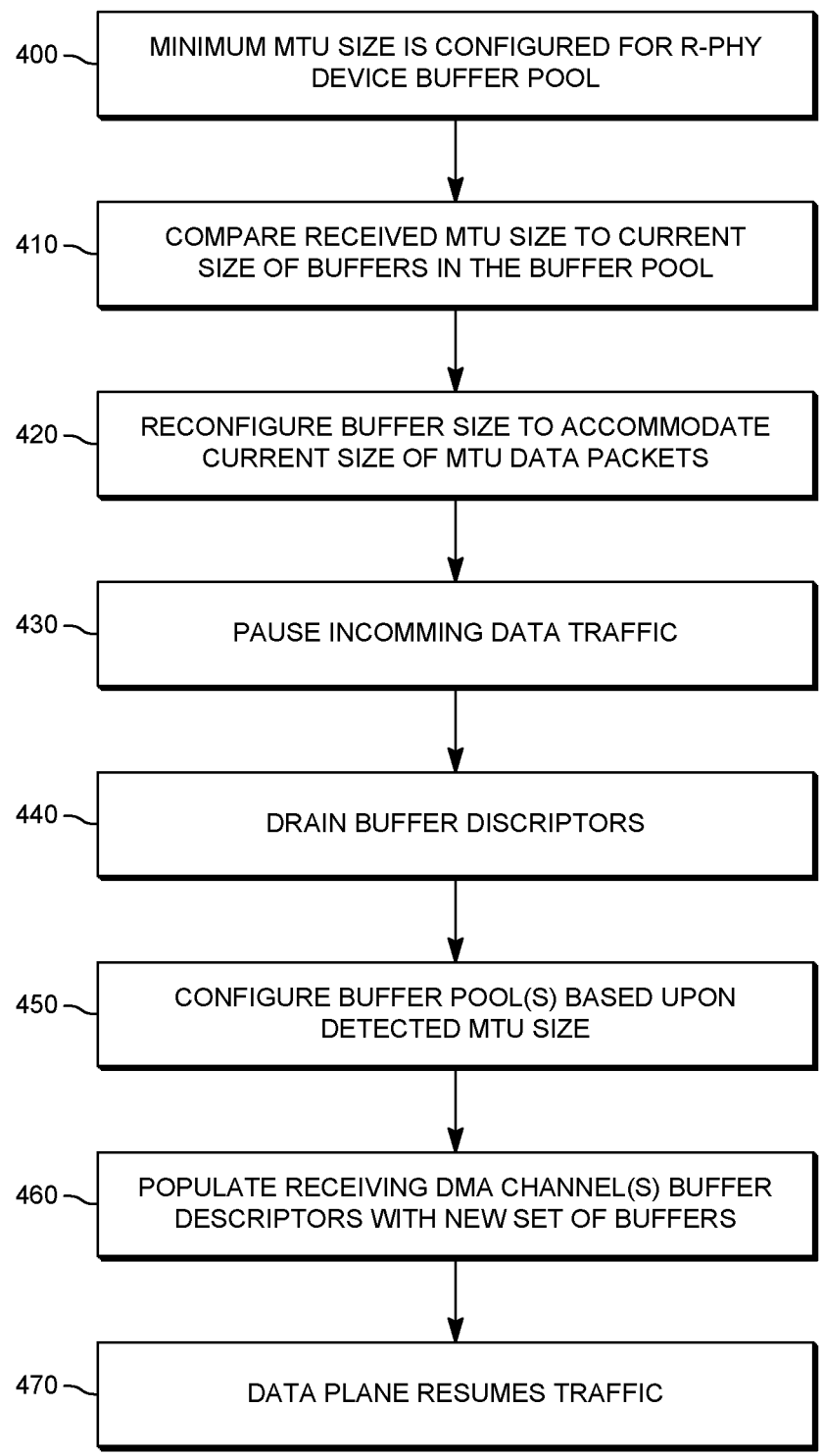
FIG. 4 illustrates reconfiguration of the buffers of the R-PHY device.

Referring to FIG. 4, to accommodate effective MTU sized data packet transfer in a manner that makes more efficient use of the DMA buffer size, it is desirable to dynamically detect the MTU size based upon the maximum MTU size of received data packets and modify the MTU size based upon such received data packets (e.g., a received downstream external PHY interface packet of DOCSIS). Preferably, upon initialization of a R-PHY device a minimum MTU size is selected for the DMA buffer for the MTU data 400, such as 1,500 bytes. In other words, the R-PHY device data plane initially configures the DMA buffer pool to use a smaller MTU buffer size. This provides a baseline MTU size that the R-PHY device supports.

The R-PHY device may compare the size of the received MTU data packets with the current size of the buffers in the buffer pool 410, which may be initially set at a minimal size, such as 1,500 bytes.

When the R-PHY device determines that the size of the received MTU data packets are larger than the current size of the buffers in the buffer pool 410, then the R-PHY device reconfigures the size of the buffers in the buffer pool to accommodate the increased (or decreased) size of the MTU data packets 420.

To reconfigure the buffer pool, initially the R-PHY device pauses the incoming data traffic 430 in order to change the buffer size of the receiving DMA channel(s) and the transmitting DMA channel(s).

After pausing the incoming data traffic 430, all of the buffer descriptors for the receiving DMA channel(s) and the transmitting DMA channel(s) may be drained of any existing data 440, and all of the buffers may be reset to a free list of buffer pool(s).

After draining any existing data from the buffer descriptors 440, the data plane is configured with new buffer pool(s) based upon the detected MTU size 450.

After configuring the new buffer pool(s) based upon the detected MTU size 450, the data plane populates the receiving DMA channel(s) buffer descriptors with the new set of buffers 460.

After populating the receiving DMA channel(s) buffer descriptors 460, the DMA is ready to use the new buffers and the data plane resumes traffic on the receiving and the transmitting DMA 470.

As a general matter, the hardware writes data into the buffer memory as set by the buffer descriptors.

Preferably, the R-PHY device performs the reconfiguration of the buffers once upon initialization to the cable system. However, the R-PHY device may monitor the data traffic and reconfiguration the buffers on a periodic basis, as needed. Also, the R-PHY device may monitor the data traffic and reconfiguration the buffers to a smaller or larger size a periodic basis, as appropriate. Also, the R-PHY device may reconfigure the buffer size upon request by a controller.

In general, the buffer reconfiguration may be used when data is transferred between two entities using DMA that has varying sizes of packets so that the buffer may be dynamically optimized based upon network MTU size and independent of the cable system environment.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A data distribution system comprising:
  (a) a head end connected to a plurality of customer devices through a transmission network that includes a remote fiber node that converts received data from said head end to analog data suitable to be provided on a coaxial cable for said plurality of customer devices;
  (b) said remote fiber node configured to receive a first maximum transmission unit from said head end, where said first maximum transmission unit represents the size of the largest protocol data unit comprising a respective data packet with (1) a header that contains information about the data packet's source and destination address and (2) payload containing contents of the data packet that can be communicated in a single network layer transaction between said remote fiber node and said head end, said first maximum transmission unit from said head end to said remote fiber node configured to support a maximum first number of bytes of data, and said remote fiber node having a buffer pool for said first maximum transmission unit including buffers sized having a first size based upon said maximum first number of bytes of said first maximum transmission unit;
  (c) said remote fiber node receiving a second maximum transmission unit from said head end, where said second maximum transmission unit represents the size of the largest protocol data unit comprising a respective data packet with (1) a header that contains information about the data packet's source and destination address and (2) payload containing contents of the data packet that can be communicated in said single network layer transaction between said remote fiber node and said head end, said second maximum transmission unit from said head end to said remote fiber node configured to support a maximum second number of bytes of data, where said maximum second number of bytes of data is different than said maximum first number of bytes of data, and
  (d) said remote fiber node, in response to said difference, reconfiguring said buffer pool including buffers sized having a second size based upon said maximum second number of bytes of said second maximum transmission unit, where said first size is different than said second size;
  (e) wherein said remote fiber node said reconfigures based upon pausing incoming data traffic in response to said difference, after pausing said incoming data traffic said remote fiber node completely draining said buffer pool of existing data, said reconfiguring the sizes of the individual buffers of said buffer pool, populating said buffer pool with a new set of buffer descriptors, and thereafter resuming incoming data traffic after a sufficient time has elapsed such that data provided to said plurality of customer devices is interrupted in a manner such that without said reconfiguring said buffer pool said plurality of customers would have otherwise received such data without interruption with temporal time period greater than said second maximum transmission unit in duration.

2. The data distribution system of claim 1 wherein said first number of bytes is 1,500 bytes and is a default configuration upon starting said remote fiber node.

3. The data distribution system of claim 1 wherein said remote fiber node is a R-PHY device.

4. The data distribution system of claim 1 wherein said remote fiber node is a R-MACPHY device.

5. The data distribution system of claim 2 wherein said second number of bytes is at least one of 2,000 bytes and 2,200 bytes.

6. The data distribution system of claim 1 wherein said remote fiber node locates data in said buffers using direct memory access.

7. The data distribution system of claim 1 wherein said second number of bytes of data is greater than said first number of bytes of data.

8. The data distribution system of claim 1 wherein said second number of bytes of data is less than said first number of bytes of data.

9. The data distribution system of claim 1 wherein said buffer pool is a level 1 cache.

* * * * *